US009673586B2

(12) United States Patent
Sato et al.

(10) Patent No.: US 9,673,586 B2
(45) Date of Patent: Jun. 6, 2017

(54) METHOD OF WATERPROOFING COATED ELECTRIC WIRE ATTACHED CONNECTOR TERMINAL

(71) Applicant: Yazaki Corporation, Minato-ku, Tokyo (JP)

(72) Inventors: Kei Sato, Makinohara (JP); Shinji Kodama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 390 days.

(21) Appl. No.: 14/588,704

(22) Filed: Jan. 2, 2015

(65) Prior Publication Data

US 2015/0123306 A1 May 7, 2015

Related U.S. Application Data

(63) Continuation of application No. PCT/JP2013/068279, filed on Jul. 3, 2013.

(30) Foreign Application Priority Data

Jul. 3, 2012 (JP) ................................. 2012-149674

(51) Int. Cl.
*B29C 45/14* (2006.01)
*H01R 43/00* (2006.01)
(Continued)

(52) U.S. Cl.
CPC ..... *H01R 43/005* (2013.01); *B29C 45/14426* (2013.01); *B29C 45/14639* (2013.01);
(Continued)

(58) Field of Classification Search
CPC .......... B29C 45/14426; B29C 45/0025; B29C 45/14819; B29C 45/14311; H01R 43/005; H01R 43/24
(Continued)

(56) References Cited

U.S. PATENT DOCUMENTS 6,761,551 B2 * 7/2004 Kondo .............. B29C 45/14426
425/116
8,011,796 B2 * 9/2011 Huang ................... G02B 26/04
353/94
(Continued)

FOREIGN PATENT DOCUMENTS

CN 1897356 A 1/2007
JP 4-324323 A 11/1992
(Continued)

OTHER PUBLICATIONS

Communication dated Oct. 10, 2016, from the State Intellectual Property Office of People's Republic of China in counterpart Application No. 201380035724.3.
(Continued)

*Primary Examiner* — Hien Vu
(74) *Attorney, Agent, or Firm* — Sughrue Mion, PLLC

(57) ABSTRACT

A method of waterproofing a coated electric wire attached connector terminal which is formed of metal material and which includes a barrel part which is crimped to a conductor which is exposed from a sheath, a terminal part, a connecting plate which is formed between the barrel part and the terminal part, and connects the barrel part and the terminal part. The method includes an adhesive material applying step in which adhesive material is applied to the connecting plate, and a molded part molding step in which the coated electric wire attached connector terminal is placed in a metal mold to form an injection space around the connecting plate, the barrel part and the sheath and resin is injected into the injection space to cover the connecting plate, the barrel part and the sheath with a resin molded part.

2 Claims, 8 Drawing Sheets

(51) Int. Cl.
  *H01R 4/70* (2006.01)
  *B29C 70/72* (2006.01)
  *H01R 13/58* (2006.01)
  *H01R 4/18* (2006.01)

(52) U.S. Cl.
  CPC ............... *B29C 70/72* (2013.01); *H01R 4/18* (2013.01); *H01R 4/70* (2013.01); *H01R 13/5845* (2013.01); *H01R 4/185* (2013.01)

(58) Field of Classification Search
  USPC .................. 264/279, 143, 135; 439/604, 606
  See application file for complete search history.

(56) References Cited

U.S. PATENT DOCUMENTS

| | | | | |
|---|---|---|---|---|
| 8,784,715 | B2 * | 7/2014 | Oohashi | B29C 45/14639 264/279 |
| 2007/0029301 | A1 | 2/2007 | Tokiwa et al. | |
| 2013/0252459 | A1 | 9/2013 | Tanaka et al. | |
| 2016/0156113 | A1 | 6/2016 | Tanaka et al. | |

FOREIGN PATENT DOCUMENTS

| | | |
|---|---|---|
| JP | 2001-162647 A | 6/2001 |
| JP | 2003-234144 A | 8/2003 |
| JP | 2006-123458 A | 5/2006 |
| JP | 2009-176537 A | 8/2009 |
| JP | 2012-3856 A | 1/2012 |
| WO | 2012/070691 A1 | 5/2012 |

OTHER PUBLICATIONS

Communication dated Mar. 8, 2017 issued by the State Intellectual Property Office of the People's Republic of China in counterpart Chinese Patent Application No. 201380035724.3.
Search Report dated Oct. 1, 2013 issued in International Application No. PCT/JP2013/068279 (PCT/ISA/210).
Written Opinion dated Oct. 1, 2013 issued in International Application No. PCT/JP2013/068279 (PCT/ISA/237).
Communication issued on Dec. 8, 2015 by the Japanese Patent Office in related Application No. 2012-149674.

* cited by examiner

METHOD OF WATERPROOFING COATED ELECTRIC WIRE ATTACHED CONNECTOR TERMINAL

CROSS REFERENCE TO RELATED APPLICATIONS

This application is a continuation of PCT application No. PCT/JP2013/068279, which was filed on Jul. 3, 2013 based on Japanese Patent Application (No. 2012-149674) filed on Jul. 3, 2012, the contents of which are incorporated herein by reference.

BACKGROUND OF THE INVENTION

1. Field of the Invention

The present invention relates to a method of waterproofing a coated electric wire attached connector terminal which is connected to one end of a coated electric wire.

2. Description of the Related Art

Traditionally, a molding metal mold is known to make a connector terminal, which is connected to one end of a coated electric wire, waterproof. This molding metal mold is provided with a hollow molding part in upper and lower metal molds, and an end connecting part is set in this molding part. This end connecting part is referred to the front end of an electric wire while a terminal metal fitting is crimped. The end connecting part is coated and molded by injecting molding resin in a melted state into the molding part of the molding metal mold (refer to a patent document 1).

CITATION LIST

Patent Documents

Patent document 1: JP-A-2001-162647

SUMMARY OF THE INVENTION

To secure the waterproofing property, it is necessary that the resin, which coats the end connecting part, not only adheres to a sheath of the coated electric wire which is made of insulating resin material, but also adheres to a connector terminal which is made of metal material. Therefore, it is desirable that the resin with which the end connecting part is molded is a resin which is excellent in adhesive performance on metal materials.

However, if the resin whose adhesion on metal materials is strong is used, when the end connecting part is molded, the resin adheres to the metal mold. Therefore, it is necessary to consider a possibility that the end connecting part is damaged when the molded end connecting part is taken out of the metal mold. Thus, the strength of the adhesion on metal materials may hinder a simple sheath molding of the end connecting part.

The present invention is made in view of the above circumstances and the object of the present invention is to provide a coated electric wire attached connector terminal and a method of waterproofing the coated electric wire attached connector terminal so that molding can be performed easily, and an excellent waterproofing effect can be ensured.

In order to accomplish the above goal, the coated electric wire attached connector of the present invention includes following features (1) and (2).

(1) According to aspect of the invention, a coated electric wire attached connector terminal includes, a barrel part which is crimped to a core line which is exposed from a sheath at one end of an electric wire, a terminal part to be electrically connected to a mating terminal, a connecting plate which is formed between the barrel part and the terminal part, and connects the barrel part and the terminal part, adhesive material which is applied to the connecting plate, and a resin molded part which is formed to cover the connecting plate, the barrel part and the sheath.

(2) In the coated electric wire attached connector terminal of (1), the connecting plate has a bottom wall and side walls which stands up to be opposed respectively from two ends of the bottom wall, and the adhesive material is applied to at least one of the inner surface of the bottom wall, the outer surface of the bottom wall, the inner surfaces of the side walls and the outer surfaces of the side walls, among the surfaces of the connecting plate.

According to the coated electric wire attached connector terminal of the above configuration (1), the adhesive material is applied to the connecting plate. Therefore, even if the resin to form the resin molded pan is not a material whose adhesion on metal materials is strong, the resin molded part can be surely adhered to the connecting plate of the coated electric wire attached connector terminal through the adhesive material, and the waterproofness can be enhanced. Thereby, because the resin whose adhesion on metal materials is weak is used, the resin can be prevented from being adhered to the metal mold when the resin molded part is molded with the metal mold. Thus, the resin molded part can be molded smoothly and easily.

According to the coated electric wire attached connector terminal of the above (2), the adhesive material is applied to at least one of the inner surface of the bottom wall, the outer surface of the bottom wall, the inner surfaces of the side walls and the outer surfaces of the side walls, among the surfaces of the connecting plate. Therefore, because an edge located at the terminal part side of the resin molded part is surely adhered to the connecting plate, invasion of water into the resin molded part can be surely prevented.

In order to accomplish the above goal, the method of waterproofing the coated electric wire attached connector of the present invention includes following features (3) and (4).

(3) According to another aspect of the invention, a method of waterproofing a coated electric wire attached connector terminal includes an adhesive material applying step in which adhesive material is applied to a connecting plate, and a molded part molding step in which the coated electric wire attached connector terminal is placed in a metal mold to form an injection space around the connecting plate, a barrel part and a sheath and resin is injected into the injection space to cover the connecting plate, the barrel part and the sheath with a resin molded part.

(4) In the adhesive material applying step of the method (3), among the surfaces of the connecting plate which has a bottom wall, and side walls which stands up to be opposed from two ends of the bottom wall, the adhesive material is applied to at least one of the inner surface of the bottom wall, the outer surface of the bottom wall, the inner surfaces of the side walls and the outer surfaces of the side walls.

According to the method of waterproofing the coated electric wire attached connector terminal of the above (3), after the adhesive material is applied to the connecting plate, the resin molded part is molded. Therefore, even if the resin to form the resin molded part is not a material whose adhesion on metal materials is strong, the resin molded part can be surely adhered to the connecting plate of the coated electric wire attached connector terminal through the adhesive material, and the coated electric wire attached connector terminal can have a high waterproofness. In addition, because the resin whose adhesion on metal materials is weak is used, the resin can be prevented from being adhered to the metal mold when the resin molded part is molded with the metal mold. Thus, the resin molded part can be molded smoothly and easily.

According to the coated electric wire attached connector terminal of the above (4), the adhesive material is applied to at least one of the inner surface of the bottom wall, the outer surface of the bottom wall, the inner surfaces of the side walls and the outer surfaces of the side walls, among the surfaces of the connecting plate. Therefore, because an edge located at the terminal part side of the resin molded part is surely adhered to the connecting plate, invasion of water into the resin molded part can be surely prevented.

According to the present invention, a coated electric wire attached connector terminal and a method of waterproofing the coated electric wire attached connector terminal can be provided so that molding can be performed easily, and an excellent waterproofing effect can be ensured.

The present invention has been briefly described above. Further, details of the present invention will become more apparent after embodiments of the invention described below (hereinafter referred to as "embodiments") are read with reference to the accompanying figures.

DESCRIPTION OF EMBODIMENT

Below, the embodiments of the present invention are explained with reference to the figures.

Figure 1:
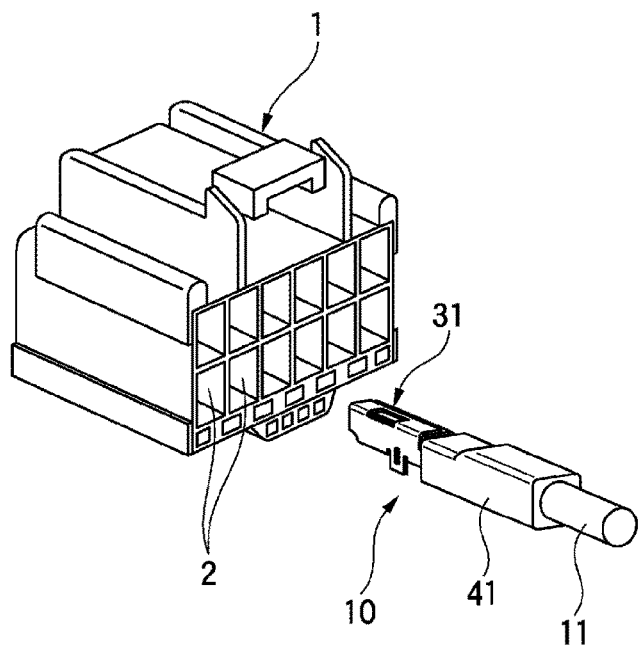
FIG. 1 is a perspective view of a coated electric wire attached connector terminal according to the present invention and a connector housing in which the coated electric wire attached connector terminal is accommodated.
Figure 2:
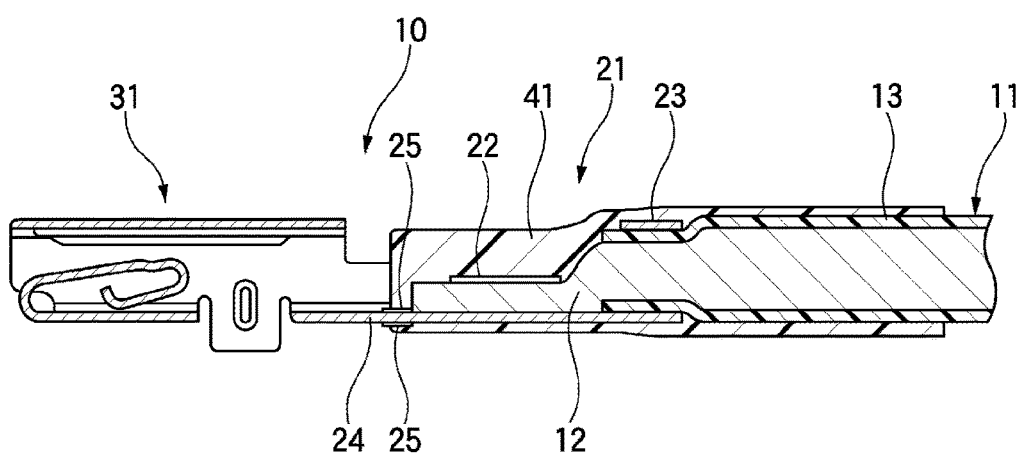
FIG. 2 is a sectional view of the coated electric wire attached connector terminal according to the present embodiment.
Figure 3:
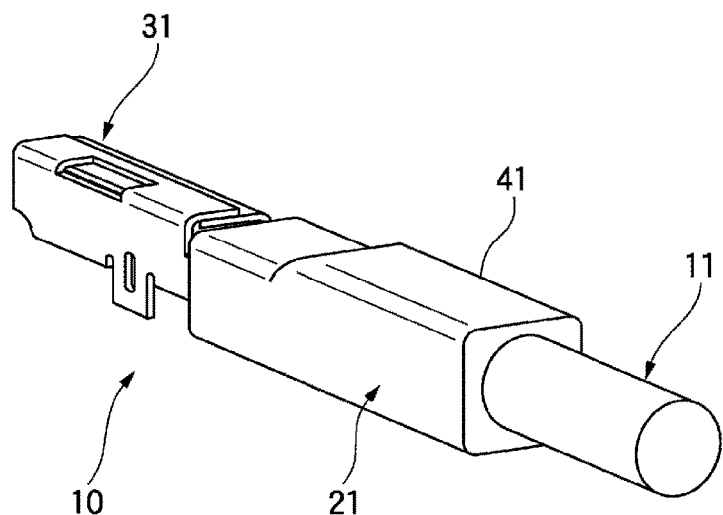
FIG. 3 is a perspective view of the coated electric wire attached connector terminal according to the present embodiment when viewed from the back end side.
Figure 4:
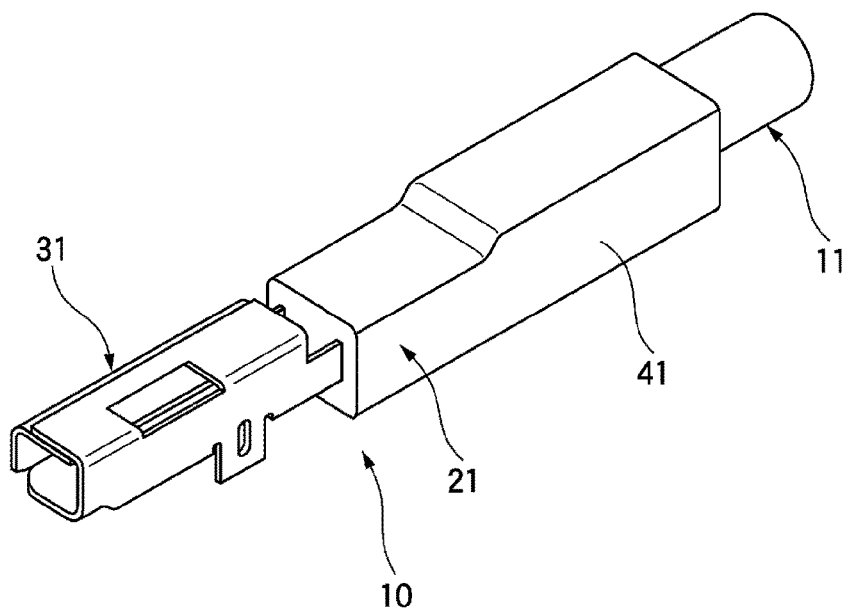
FIG. 4 is a perspective view of the coated electric wire attached connector terminal according to the present embodiment when viewed from the front end side.
Figure 5:
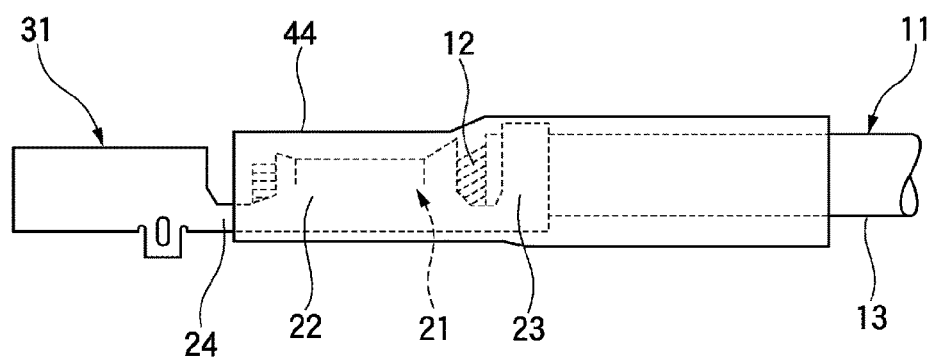
FIG. 5 is a side view of the coated electric wire attached connector terminal according to the present embodiment.
Figure 6:
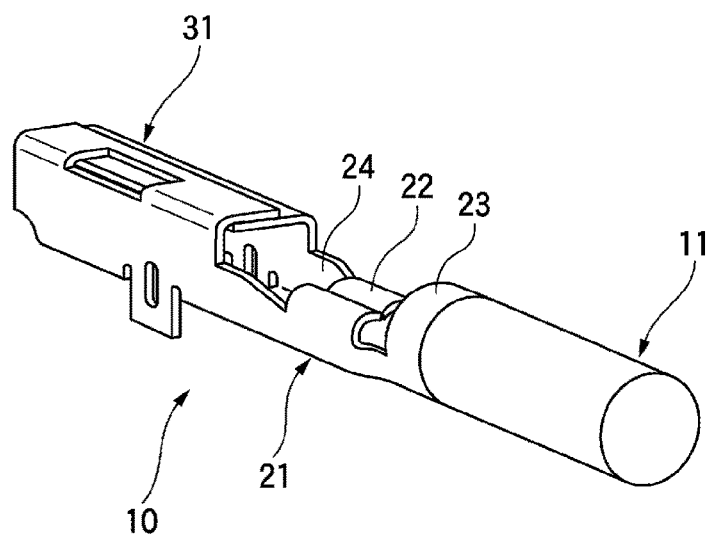
FIG. 6 is a perspective view of the coated electric wire attached connector terminal according to the present embodiment when viewed from the back end side before a resin molded part is molded.
Figure 7:
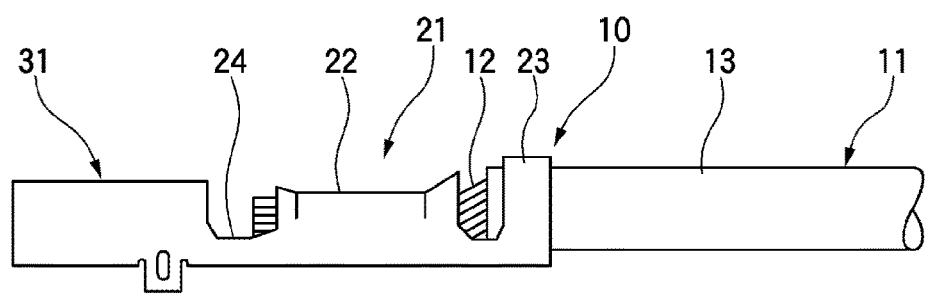
FIG. 7 is a side view of the coated electric wire attached connector terminal according to the present embodiment before the resin molded part is molded.
Figure 8:
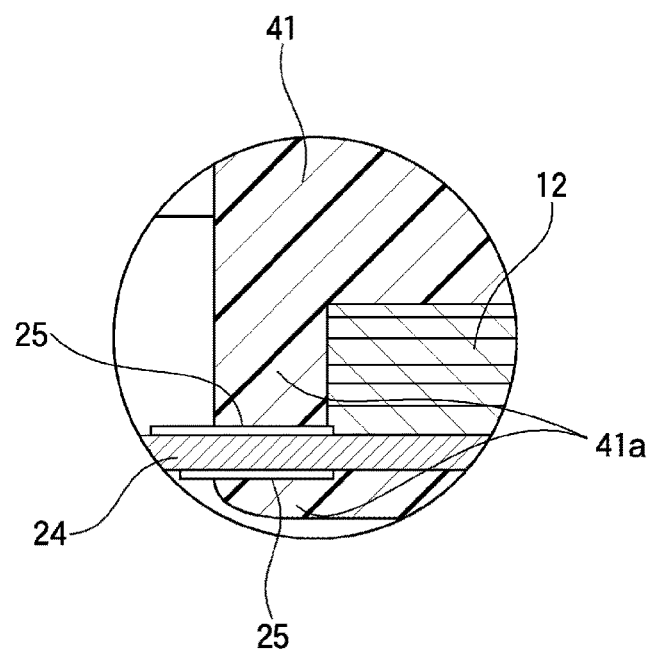
FIG. 8 is a sectional view of a part of the coated electric wire attached connector terminal according to the present embodiment.

FIG. 1 is a perspective view of a coated electric wire attached connector terminal according to the present invention and a connector housing in which the coated electric wire attached connector terminal is accommodated. FIG. 2 is a sectional view of the coated electric wire attached connector terminal according to the present embodiment. FIG. 3 is a perspective view of the coated electric wire attached connector terminal according to the present embodiment when viewed from the back end side. FIG. 4 is a perspective view of the coated electric wire attached connector terminal according to the present embodiment when viewed from the front end side. FIG. 5 is a side view of the coated electric wire attached connector terminal according to the present embodiment. FIG. 6 is a perspective view of the coated electric wire attached connector terminal according to the present embodiment when viewed from the back end side before a resin molded part is molded. FIG. 7 is a side view of the coated electric wire attached connector terminal according to the present embodiment before the resin molded part is molded. FIG. 8 is a sectional view of a part of the coated electric wire attached connector terminal according to the present embodiment.

As shown in FIG. 1, a coated electric wire attached connector terminal 10 according to the present embodiment is connected to an electric wire 11. The coated electric wire attached connector terminal 10 is inserted into and accommodated in either one of a plurality of terminal accommodating rooms 2 which a connector housing 1 is formed with. When the connector housing 1 is connected to a mating connector housing, the coated electric wire attached connector terminal 10 is connected to a mating connector terminal.

As shown in FIGS. 2-7, the coated electric wire attached connector terminal 10 is formed by, for example, forging a conductive metal material such as copper or copper alloy. The coated electric wire attached connector terminal 10 has a barrel part 21, a connecting plate 24 and a tab terminal part (terminal part) 31. A tin plating is performed on the surface of the coated electric wire attached connector terminal 10 which has the barrel part 21, the connecting plate 24 and the tab terminal part (terminal part) 31. On the other hand, the electric wire 11, which is connected to the coated electric wire attached connector terminal 10, has a core line (conductor) 12 and a sheath 13 which is extruded and coated around the core line 12. The sheath 13 of the electric wire 11 is formed of halogen-free resin.

The barrel part 21 has a core line crimping part 22 and a sheath crimping part 23. The core line crimping part 22 includes a bottom wall and side walls which stand up to be opposed respectively from two ends of the bottom wall which are located at two sides in a direction crossing the longitudinal direction of the coated electric wire attached connector terminal 10. The core line 12 which is exposed at an end of the electric wire 11 is tightened by the side walls of the core line crimping part 22. Thereby, the core line crimping part 22 is crimped to the core line 12, and the core line 12 of the electric wire 11 and the barrel part 21 of the coated electric wire attached connector terminal 10 are connected. The sheath crimping part 23 includes a bottom wall and side walls which stand up to be opposed respectively from two ends of the bottom wall which are located at two sides in a direction crossing the longitudinal direction of the coated electric wire attached connector terminal 10. The sheath 13 at the end of the electric wire 11 is tightened by the side walls of the sheath crimping part 23. Thereby, the sheath crimping part 23 is crimped to the sheath 13, and the coated electric wire attached connector terminal 10 is fixed to the sheath 13 of the electric wire 11. A tying plate is located between the core line crimping part 22 and the sheath crimping part 23. The tying plate includes a bottom wall which ties the bottom wall of the core line crimping part 22 and the bottom wall of the sheath crimping part 23, respectively, and side walls which tie the lower halves of the side walls of the core line crimping part 22 and the lower halves of the side walls of the sheath crimping part 23, respectively. The core line crimping part 22 and the sheath crimping part 23 are connected through the tying plate.

The tab terminal part 31 is a part to which the tab of a mating terminal is connected, and is formed in a box-like shape. The tab terminal part 31 includes a bottom wall and side walls which stand up to be opposed respectively from two ends of the bottom wall which are located at two sides in a direction crossing the longitudinal direction of the coated electric wire attached connector terminal 10. When the upper halves of the side walls are bent towards the bottom wall, and the two side walls are overlapped, the ceiling wall of the tab terminal part 31 is formed. In this way, the tab terminal part 31 becomes a box-like shape whose four walls are formed by the bottom wall, the two side walls and the ceiling wall. When the tab of the mating terminal is connected to the tab terminal part 31, the coated electric wire attached connector terminal 10 and the mating terminal are electrically connected. In the present embodiment, it is described that the coated electric wire attached connector terminal 10 has the tab terminal part 31 of the box-like shape, but the terminal part which is connected to a mating terminal of the coated electric wire attached connector terminal 10 can have various shapes such as a male type shape, a female type shape or a LA terminal (ground terminal) shape.

The connecting plate 24 is formed between the barrel part 21 and the tab terminal part 31 and joins the barrel part 21 and the tab terminal part 31. The connecting plate 24 includes a bottom wall which connects the bottom wall of the core line crimping part 22 and the bottom wall of the tab terminal part 31, respectively, and side walls which connects the lower halves of the side walls of the core line crimping part 22 and the lower halves of the side walls of the tab terminal part 31, respectively. The barrel part 21 and the tab terminal part 31 are connected through the connecting plate 24.

As shown in FIG. 8, the front end of the core line 12 of the electric wire 11 which is crimped to the core line crimping part 22 is located on the connecting plate 24. While the bottom wall of the connecting plate 24 contact the front end of the core line 12 of the electric wire 11, the connecting plate 24 is covered by a resin molded part 41 to be described below. On the inner surface of the bottom wall, the outer surface of the bottom wall, the inner surfaces of the side walls and the outer surfaces of the side walls, among the surfaces of the connecting plate 24, primer material (adhesive material) 25 is applied (refer to FIGS. 9 and 10.). The primer material 25 is made of synthetic resin which has insulating property, and has excellent adhesive performance when being applied on the coated electric wire attached connector terminal 10 formed of metal material and the sheath 13 of the electric wire 11 formed of resin material. For example, the primer material 25 is polypropylene-based resin.

The coated electric wire attached connector terminal 10 further includes the resin molded part 41. The resin molded part 41 is formed by injection-molding a synthetic resin, which has insulating property, such as thermoplastic elastomeric material. For example, the same material as that of the sheath 13 of the electric wire 11 is used as the resin material of the resin molded part 41. As shown in FIGS. 2-5, the resin molded part 41 is formed to cover the barrel part 21, the connecting plate 24 and the sheath 13 of the electric wire 11. The resin molded part 41 has an edge part 41*a* which is located at the tab terminal part 31 side of the resin molded part 41 and faces the connecting plate 24. The edge part 41*a* is surely adhered through the primer material 25 to the inner surface of the bottom wall, the outer surface of the bottom wall, the inner surfaces of the side walls and the outer surfaces of the side walls, among the surfaces of the connecting plate 24, onto which the primer material 25 is applied. In this way, the coated electric wire attached connector terminal 10 is waterproofed since the barrel part 21 which is crimped to the core line 12, the connecting plate 24 and the sheath 13 of the electric wire 11 are covered by the resin molded part 41.

Then, a method of molding the resin molded part 41 to waterproof the coated electric wire attached connector terminal 10 is described.

Figure 9:
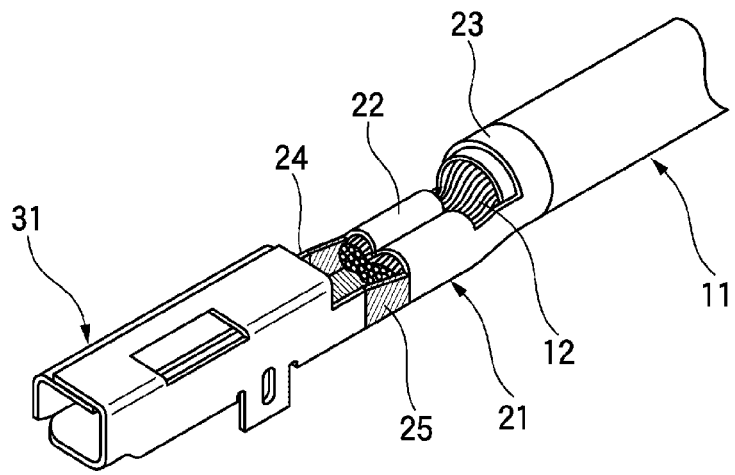
FIG. 9 is a perspective view of a part of the coated electric wire attached connector terminal to describe a method of waterproofing the coated electric wire attached connector terminal according to the present embodiment.
Figure 10:
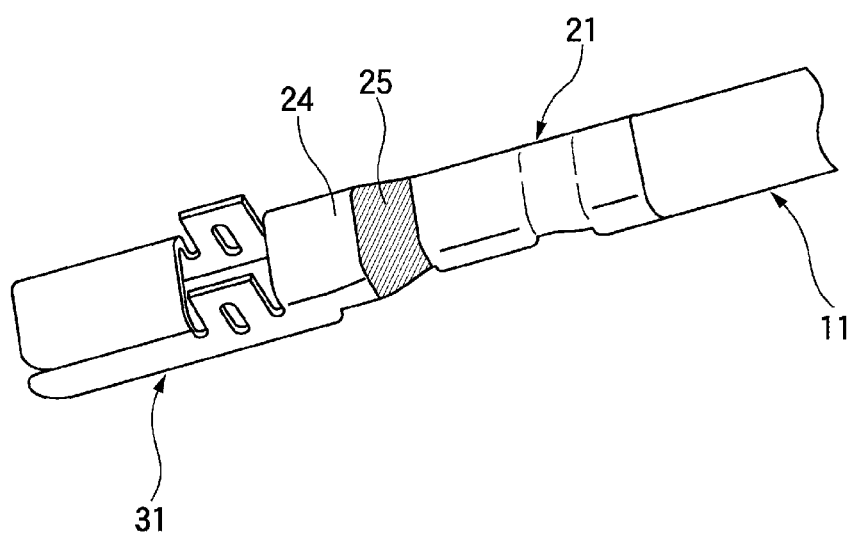
FIG. 10 is a perspective view of a part, which is viewed from the back side, of the coated electric wire attached connector terminal to describe the method of waterproofing the coated electric wire attached connector terminal according to the present embodiment.
Figure 11:
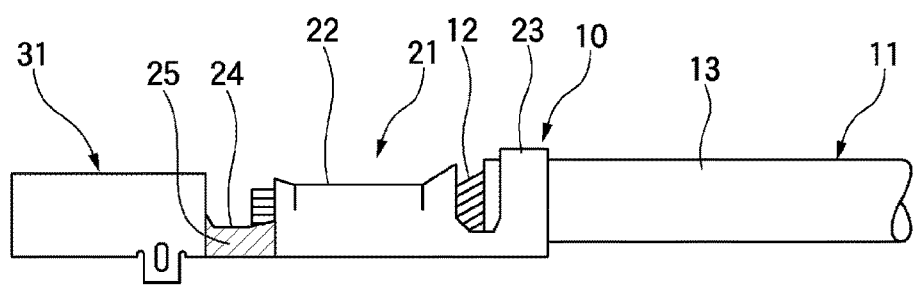
FIG. 11 is a side view of the coated electric wire attached connector terminal to describe the method of waterproofing the coated electric wire attached connector terminal according to the present embodiment.
Figure 12:
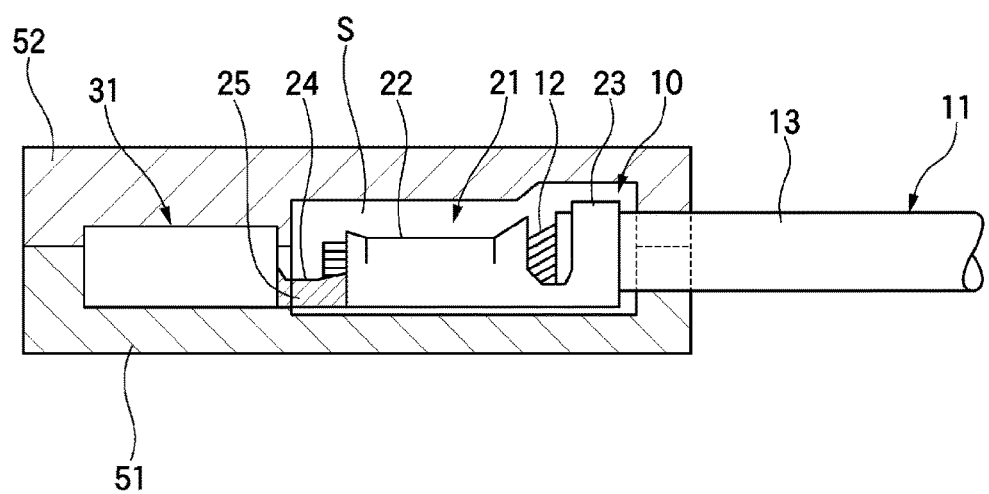
FIG. 12 is a side view of the coated electric wire attached connector terminal to describe the method of waterproofing the coated electric wire attached connector terminal according to the present embodiment.
Figure 13:
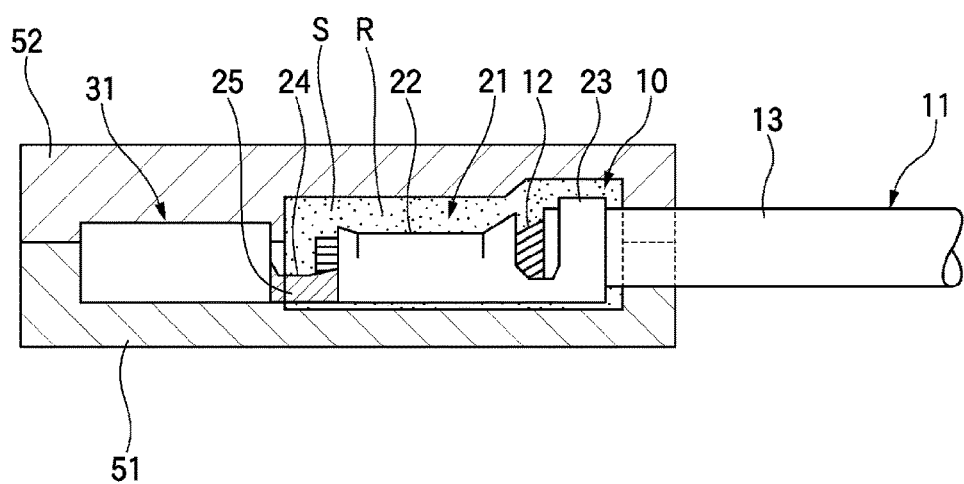
FIG. 13 is a side view of the coated electric wire attached connector terminal to describe the method of waterproofing the coated electric wire attached connector terminal according to the present embodiment.

FIG. 9 is a perspective view of a part of the coated electric wire attached connector terminal to describe a method of waterproofing the coated electric wire attached connector terminal according to the present embodiment. FIG. 10 is a perspective view of a part, which is viewed from the back side, of the coated electric wire attached connector terminal to describe the method of waterproofing the coated electric wire attached connector terminal according to the present embodiment. FIG. 11 is a side view of the coated electric wire attached connector terminal to describe the method of waterproofing the coated electric wire attached connector terminal according to the present embodiment. FIG. 12 is a side view of the coated electric wire attached connector terminal to describe the method of waterproofing the coated electric wire attached connector terminal according to the present embodiment. FIG. 13 is a side view of the coated electric wire attached connector terminal to describe the method of waterproofing the coated electric wire attached connector terminal according to the present embodiment.

To connect the electric wire 11 to the coated electric wire attached connector terminal 10, first, the sheath 13 at an end of the electric wire 11 is cut and removed to expose the core line 12 (electric wire exposing step).

Then, the core line crimping part 22 and the sheath crimping part 23 in the barrel part 21 are crimped so that the core line crimping part 22 is crimped to the core line 12 of the electric wire 11, and the sheath crimping part 23 is crimped to the sheath 13 (electric wire crimping step). Thereby, the core line 12 of the electric wire 11 and the coated electric wire attached connector terminal 10 are connected.

Then, as shown in FIGS. 9-11, the primer material 25 is applied to a part of the connecting plate 24 (adhesive material applying step). From FIG. 9 to FIG. 11, the primer material 25 is applied on all lateral surfaces of the connecting plate 24, namely, the inner surface of the bottom wall, the outer surface of the bottom wall, the inner surfaces of the side walls and the outer surfaces of the side walls, among the surfaces of the connecting plate 24. From FIG. 9 to FIG. 11, hatching is made at places where the primer material 25 is applied.

Then, as shown in FIG. 12, a lower metal mold (metal mold) 51 and an upper metal mold (metal mold) 52 match each other to cover the coated electric wire attached connector terminal 10. Then, an injection space S is formed around the barrel part 21, the connecting plate 24 and the sheath 13 of the electric wire 11. Under this condition, as shown in FIG. 13, resin R is injected from a gate (not shown in the figure) into the injection space S so that the barrel part 21, the connecting plate 24 and the sheath 13 of the electric wire 11 are covered with the resin molded part 41 which is formed of the resin R (molded part molding step).

After a predetermined period of time, the resin R is cured, the upper metal mold 52 is separated from the lower metal mold 51, and the coated electric wire attached connector terminal 10 in which the barrel part 21, the connecting plate 24 and the sheath 13 of the electric wire 11 are covered with the resin molded part 41 is demolded (demolding step). In the coated electric wire attached connector terminal 10 molded in this way, the edge part 41a, which is located at the tab terminal part 31 side of the resin molded part 41, is adhered through the primer material 25 to the inner surface of the bottom wall, the outer surface of the bottom wall, the inner surfaces of the side walls and the outer surfaces of the side walls of the connecting plate 24.

Thereby, the connecting plate 24 becomes surely waterproofed by the resin molded part 41.

As mentioned above, according to the coated electric wire attached connector terminal and the method of waterproofing the coated electric wire attached connector terminal of the present embodiment, the primer material 25 is applied onto the connecting plate 24 and then the resin molded part 41 is molded. Therefore, even if the resin R of the resin molded part 41 is not a material whose adhesion on metal materials is strong, the resin molded part 41 can be surely adhered to the connecting plate 24 of the coated electric wire attached connector terminal 10 through the primer material 25. As a result, the coated electric wire attached connector terminal 10 can have a high waterproofing property. Because the resin whose adhesion on metal materials is weak is used, the resin can be prevented from being adhered to the lower metal mold 51 and the upper metal mold 52 when the resin molded part 41 is molded with the metal mold. Thus, the resin molded part 41 can be molded smoothly and easily.

Thus, because the connecting plate 24 is surely sealed with the resin molded part 41 and high corrosion resistance can be ensured in a long term, the next effect can be anticipated. That is, even if different kinds of metals (copper or copper alloy and aluminum) are connected, for example, like the case that the electric wire 11 whose core line 12 is aluminum is connected, electrolytic corrosion, such as corrosion when different metals contact because the connection place where these metals contact is covered by water, can be prevented.

In the embodiment, it is described that all lateral surfaces of the connecting plate 24 are applied with the primer material 25. The places where the primer material 25 is applied are not limited to these. Among the surfaces of the connecting plate 24, the primer material 25 may be applied to at least one of the inner surface of the bottom wall, the outer surface of the bottom wall, the inner surfaces of the side walls and the outer surfaces of the side walls.

Figure 14:
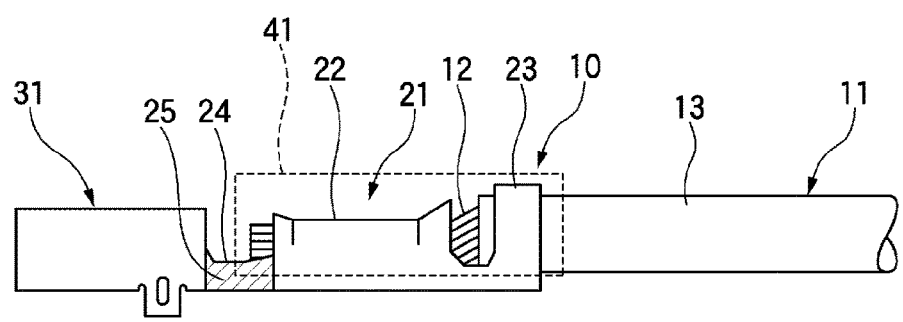
FIG. 14 is a side view of a coated electric wire attached connector terminal according to a variation.
Figure 15:
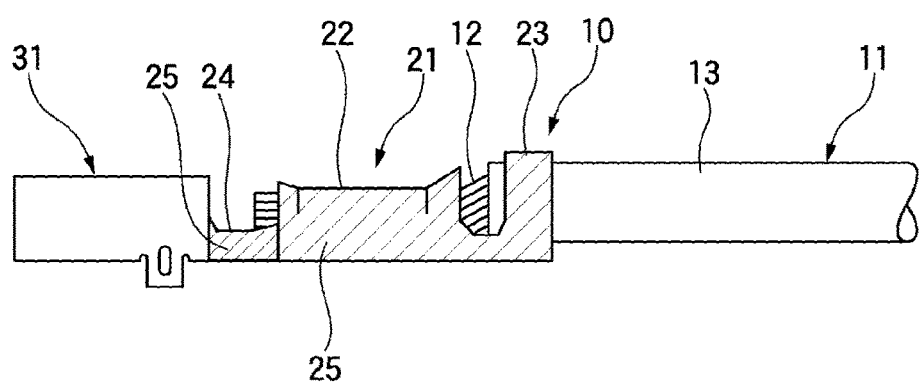
FIG. 15 is a side view of the coated electric wire attached connector terminal to describe a method of waterproofing the coated electric wire attached connector terminal according to the variation.

Further, the primer material 25 may be applied to the barrel part 21. As shown in FIG. 14, without covering the whole of the barrel part 21, the resin molded part 41 may be molded to cover the part except the bottom side of the barrel part 21. In this case, as shown in FIG. 15, it is desirable to apply the primer material 25 on the outer surfaces of the side walls of the core line crimping part 22, the sheath crimping part 23 and the tying plate of the barrel part 21.

In this way, when the resin molded part 41 is molded, the resin molded part 41 will be strongly adhered to the core line crimping part 22, the sheath crimping part 23 and the tying plate of the barrel part 21 through the primer material 25, and a good waterproofing property can be ensured.

The present invention is not limited to the above described embodiments, and suitable modifications, improvements or the like can be made. Moreover, the materials, shapes, dimensions, numbers, installation places, and the like of the components in the above embodiment are arbitrarily set as far as the invention can be attained, and not particularly restricted.

The features of the embodiments of the coated electric wire attached connector terminal and the method of waterproofing the coated electric wire attached connector terminal according to the present invention described above are briefly, collectively listed in the following [1] to [4], respectively.

[1] A coated electric wire attached connector terminal comprising
a barrel part (21) which is crimped to a core line (12) which is exposed from a sheath (13) at one end of an electric wire (11),
a terminal part (tab terminal part 31) to be electrically connected to a mating terminal, a connecting plate (24) which is formed between the barrel part (21) and the terminal part (tab terminal part 31), and connects the barrel part (21) and the terminal part (tab terminal part 31),
adhesive material (primer material 25) which is applied to the connecting plate (24), and
a resin molded part (41) which is formed to cover the connecting plate (24), the barrel part (21) and the sheath (13).

[2] The coated electric wire attached connector terminal according to [1], wherein
the connecting plate (24) has a bottom wall and side walls which stands up to be opposed respectively from two ends of the bottom wall, and
the adhesive material (the primer material 25) is applied to at least one of the inner surface of the bottom wall, the outer surface of the bottom wall, the inner surfaces of the side walls and the outer surfaces of the side walls, among the surfaces of the connecting plate (24).

[3] A method of waterproofing a coated electric wire attached connector terminal which is formed of metal material and which comprises a barrel part (21) which is crimped to a core line (12) which is exposed from a sheath (13) at one end of an electric wire (11), a terminal part (tab terminal part 31) to be electrically connected to a mating terminal, a connecting plate (24) which is formed between the barrel part (21) and the terminal part (tab terminal part 31), and connects the barrel part (21) and the terminal part (tab terminal part 31), comprising an adhesive material applying step in which adhesive material (primer material 25) is applied to the connecting plate (24), and a molded part molding step in which the coated electric wire attached connector terminal is placed in a metal mold to form an injection space around the connecting plate (24), the barrel part (21) and the sheath (13) and resin is injected into the injection space to cover the connecting plate (24), the barrel part (21) and the sheath (13) with a resin molded part (41).

[4] The method of waterproofing the coated electric wire attached connector terminal according to [3], wherein, in the adhesive material applying step, among the surfaces of the connecting plate (24) which has a bottom wall, and side walls which stands up to be opposed from two ends of the bottom wall, the adhesive material (primer material 25) is applied to at least one of the inner surface of the bottom wall, the outer surface of the bottom wall, the inner surfaces of the side walls and the outer surfaces of the side walls.

Although the invention is described in detail with reference to the specific embodiments, it is apparent that various modifications and amendments may be made by those skilled in the art without departing from the spirit and scope of the invention.

The connector terminal of the present invention can be molded easily and an excellent waterproofing effect can be ensured. Therefore, the present invention is useful in the field of a connector terminal connected to an end of a cable and a method of waterproofing the connector terminal.

REFERENCE SIGN LIST 10 connector terminal
11 electric wire
12 core line
13 sheath
21 barrel part
25 primer material (adhesive material)
31 tab terminal part
41 resin molded part
41a edge part
51 lower metal mold
52 upper metal mold
R resin
S injection space

What is claimed is:

1. A method of waterproofing a coated electric wire attached connector terminal which is formed of metal material and which includes a barrel part which is crimped to a conductor which is exposed from a sheath at one end of an electric wire, a terminal part to be electrically connected to a mating terminal, a connecting plate which is formed between the barrel part and the terminal part, and connects the barrel part and the terminal part, the method comprising:

an adhesive material applying step in which adhesive material is applied to the connecting plate, and a molded part molding step in which the coated electric wire attached connector terminal is placed in a metal mold to form an injection space around the connecting plate, the barrel part and the sheath and resin is injected into the injection space to cover the connecting plate, the barrel part and the sheath with a resin molded part, wherein, in the adhesive material applying step, among the surfaces of the connecting plate which has a bottom wall, and side walls which stands up to be opposed from two ends of the bottom wall, the adhesive material is applied to the inner surface of the bottom wall, the outer surface of the bottom wall, the inner surfaces of the side walls and the outer surfaces of the side walls; and wherein the adhesive material is provided between the resin molded part and the connecting plate such that the adhesive material extends out of the resin molded part.

2. The method of waterproofing the coated electric wire attached connector terminal according to claim 1, wherein the connector terminal is accommodated in a plurality of terminal accommodating rooms formed in a connector housing after the molding part molding step.

* * * * *